United States Patent [19]
Chenebault et al.

[11] 3,842,283
[45] Oct. 15, 1974

[54] METHOD FOR DETERMINING THE PROPORTION OF BROKEN PARTICLES IN THE FUEL COMPACTS EMPLOYED IN HIGH TEMPERATURE REACTORS

[75] Inventors: Pierre Chenebault, Grenoble; Marie-Louise Pointud, Seyssinet, both of France

[73] Assignee: Commissariat A L'Energie Atomique, Paris, France

[22] Filed: May 30, 1973

[21] Appl. No.: 365,111

[30] Foreign Application Priority Data
June 7, 1972  France............................ 720494

[52] U.S. Cl.................... 250/492, 176/19, 250/366, 250/499
[51] Int. Cl.............................................. G01t 1/00
[58] Field of Search .......... 250/312, 358, 359, 360, 250/366, 492, 303, 499; 176/19 LD, 13

[56] References Cited
UNITED STATES PATENTS

| | | | |
|---|---|---|---|
| 2,781,309 | 2/1957 | Levinger et al. | 250/492 |
| 3,705,985 | 12/1972 | Manning et al. | 250/492 |

Primary Examiner—Archie R. Borchelt
Assistant Examiner—Harold A. Dixon
Attorney, Agent, or Firm—Cameron, Kerkam, Sutton, Stowell & Stowell

[57] ABSTRACT

A method for determining the proportion of broken particles before, during and after irradiation in fuel compacts consisting of particles dispersed in a graphite matrix, each compact being formed by a kernel of fissile material surrounded by a fission-product retention coating.

The method consists in placing the compacts to be tested in a neutron flux together with reference compacts which contain a known number of uncoated kernels of fissile material, in entraining the fission gases released from the broken particles and uncoated kernels in a stream of inert gas or in a vacuum, in trapping the gases, in measuring the quantities of said gases by comparing the results obtained from the reference compacts and from the compacts to be tested and in deducing the proportion of broken particles.

9 Claims, No Drawings

METHOD FOR DETERMINING THE PROPORTION OF BROKEN PARTICLES IN THE FUEL COMPACTS EMPLOYED IN HIGH TEMPERATURE REACTORS

This invention relates to a rapid and non-destructive method whereby the proportion of broken particles which are present in fuel compacts employed in high-temperature nuclear reactors (HTR's) is determined before, during and after irradiation.

Each fuel particle is constituted by a kernel of $UO_2$ coated with a number of layers of pyrocarbon and if necessary with an intermediate layer of silicon carbide which constitute a practically impervious barrier to fission products. The particles are compacted within a graphite matrix.

A power reactor has approximately $10^6$ fuel compacts each containing $10^4$ particles. Conditions of safety impose a proportion of broken particles of the order of $10^{-4}$ per compact. Before being placed within the reactor, the fuel compacts must therefore not contain more than one broken particle per compact on an average, thereby entailing the need for rigorous inspection.

While some compacts contain defective particles even prior to irradiation, other compacts contain defective particles only after a certain period of operation. It therefore appears desirable to ensure by means of a method of localization of damaged particles that faulty fuel elements can be withdrawn from reactors and especially from high-temperature pebble-bed reactors.

The methods employed up to the present time for production testing of fuel compacts consist of a chemical or electro-chemical attack of compacts in an acid medium which is usually nitric acid. Said attack results in disintegration of the matrix and causes the free uranium to pass into solution. This treatment is followed or not by combustion of the graphite down to the outer layer of pyrocarbon. Determination of the uranium in solution is then carried out by colorimetry, $\alpha$-counting, X-ray fluorescence and the like.

Since these methods are essentially based on the principle of destructive testing, the number of compacts processed can only be relatively small. Evaluation of the proportion of broken particles therefore relies on a statistical calculation which is unsatisfactory since the limit of tolerance is of the order of one broken particle per compact.

This invention relates to a method for determining the proportion of broken particles before, during and after irradiation in compacts which are formed in each case by a graphite matrix and by particles each consisting of a kernel of fissile material provided with a coating which is impervious to fission products, the method being characterized in that it consists in placing in a neutron flux the compacts to be tested and the reference compacts containing a known number of kernels of fissile material which are not provided with an impervious coating, in entraining in an inert gas stream or in a vacuum the fission gases which are released from the broken particles and from the uncoated kernels, in trapping said fission gases, in measuring the quantities of said gases by comparing the results obtained in the case of the reference compacts and in the case of the compacts to be tested and in deducing the proportion of broken particles.

Irradiation takes place at a temperature within the range of 100° to 800°C and preferably 600° to 800°C at a maximum in a thermal neutron flux of low intensity of the order of $10^{10}$ to $10^{12}$ $n_{th} \cdot cm^{-2} \cdot s^{-1}$. Under these conditions, the fission gases escape from the kernels by means of a mechanism which is not activated by the temperature.

The gases are entrained either in a vacuum or in a flow of helium, for example, are entirely trapped and immediately analyzed by $\gamma$ spectrometry on a germanium-lithium detector.

By working on gases having short half-lives such as $Xe^{138}$ (14.16 minutes) or, better still, $Xe^{137}$ (3.8 minutes) and $Kr^{89}$ (3.17 minutes), an irradiation time of one hour or even one-quarter hour in the two cases last mentioned is sufficient to obtain a reliable response.

The method according to the invention is applied before, during and after irradiation of compacts in power reactors. Prior to irradiation, said method permits rapid testing of compacts which are checked individually in order to be either accepted or rejected. After a period of residence in an experimental reactor, for example, the compacts are discharged into a hot cell. Since said compacts have been subjected to a low radiation dose, it is only necessary to wait for a few weeks in order that they may be handled without danger.

In the case of power HTR's of the pebble-bed type, the compacts in the form of pebbles or spheres circulate in helium and their burn-up rate is checked periodically. If the time of passage of said compacts outside the reactor core is sufficiently long to permit decay of the short-lived isotopes, the present invention makes it possible to determine the number of broken particles contained with each sphere. To this end, it is only necessary to dierect a beam of neutrons for a short instant into each sphere taken separately and to analyze the short-lived isotopes which are released.

The method according to the invention makes it possible to localize the broken particles in the irradiation device itself during periods of shut-down of the experimental reactor. There is employed for this purpose a neutron collimator which operates at low flux. The samples to be measured or the irradiation capsule which contains these latter pass within the neutron flux and the short-lived isotopes which are entrained by a circulation of helium are then measured.

The main advantage of the method according to the invention lies in the fact that it does not result in destruction of compacts. By means of this method, it is also possible to carry out rapid tests and to provide valuable information on the causes of coating failures.

Further properties and advantages of the method in accordance with the invention will be brought out by a description of the following tests which have been performed on the one hand on uncoated kernels contained in a graphite matrix, that is to say compacts in which the uranium dioxide particles are not coated with silicon carbide and on the other hand on compacts containing uranium dioxide kernels coated with impervious layers of pyrocarbon and silicon carbide.

I — Results obtained from uncoated kernels

After having placed four uncoated kernels in a graphite block within the core of an experimental reactor, a study was made on the release of fission products at temperatures within the range of 100° to 800°C. in a flux of approximately $2.6 \times 10^{11}$ $n_{th}$ $cm^{-2} \cdot s^{-1}$, from three types of uncoated kernels having different porosities, namely 6 percent, 16 percent and 20 percent. In all cases, the released fraction of fission gases from $Xe^{138}$ to $Kr^{85m}$ was measured from fifteen minutes to several hours of irradiation.

The released fission gases were entrained by a stream of helium of 100 cm³ NTP (normal temperature and pressure) per minute which was circulated around the graphite at an absolute pressure of 2 bars. At the outlet of the furnace, a wiredrawing or throttling valve permitted a reduction in pressure to 1 bar in the sampling bay. The krypton and xenon gases were retained on activated carbon traps at the temperature of liquid nitrogen and the helium was discharged to the effluents.

The results obtained essentially demonstrate the fact that it is possible in a period of one hour to obtain a stable value in respect fo the released fraction F of the following isotopes:

$Xe^{137}, Xe^{138}, KR^{87}, Kr^{88}, Kr^{89}$

It will be noted that the released fraction F is expressed as follows:

F = number of atoms formed during the time interval $t$ /number of atoms present during the time interval $t$ II — Results obtained from compacts Three tests were performed on compacts containing statistically two broken particles as established by chemical analysis.

The compacts which were three in number were subjected to irradiation conditions similar to those of the uncoated kernels, namely a flux of $2.6 \times 10^{11}$ $n_{th}$ cm$^{-2}$ · s$^{-1}$ and an irradiation time of 2 to 6 hours. It was found that:

the resistance of the compacts was wholly similar to that of the uncoated kernels;

the rate of release of fission gases $Xe^{137}, Xe^{138}, Kr^{87}, Kr^{88}, Kr^{85}, Kr^{89}$ was stable in less than 1 hour;

the released fraction of the fission gases was independent of the half-lives of the isotopes considered.

After a very short irradiation time, the quantity of free uranium in the thre compacts under study was assessed. There was obtained the equivalent of:

one broken particle in the first compact;

two broken particles in the second compact;

less than 0.1 broken particle in the third compact (contamination).

After irradiation, chemical analyses confirmed the results.

What we claim is:

1. A method for determining the proportion of broken particles before, during and after irradiation in compacts which are formed in each case by a graphite matrix and by particles each consisting of a kernel of fissile material provided with a coating which is impervious to fission products, wherein said method consists in placing in a neutron flux the compacts to be tested and the reference compacts containing a known number of kernels of fissile material which are not provided with an impervious coating, in entraining in an inert gas stream or in a vacuum the fission gases which are released from the broken particles and from the uncoated kernels, in trapping said fission gases, in measuring the quantities of said gases by comparing the results obtained in the case of the reference compacts and in the case of the compacts to be tested and in deducing the proportion of broken particles therefrom.

2. A method according to claim 1, wherein the fissile material is uranium dioxide.

3. A method according to claim 1, wherein the impervious coating is formed of pyrocarbon with an outer coating of silicon carbide.

4. A method according to claim 1, wherein the impervious coating is formed of pyrocarbon.

5. A method according to claim 1, wherein use is made of a thermal neutron flux having an intensity within the range of $10^{10}$ to $10^{12}$ $n_{th}$ cm$^{-2}$ · s$^{-1}$.

6. A method according to claim 1 and claim 2, wherein the neutron irradiation takes place at a temperature within the range of 100° to 800°C.

7. A method according to claim 1 and claim 2, wherein the neutron irradiation takes place at a temperature within the range of 600° to 800°C.

8. A method according to claim 1, wherein the trapped fission gases are counted by γ spectrography on a germanium-lithium detector.

9. A method according to claim 1, wherein the degree of irradiation corresponds to a period of less than two hours.

* * * * *